United States Patent
Kamiya et al.

(10) Patent No.: US 12,227,194 B2
(45) Date of Patent: Feb. 18, 2025

(54) VEHICLE CONTROL DEVICE INCLUDING VEHICLE RELATIVE POSITION CALCULATION DEVICE

(71) Applicant: Mitsubishi Electric Corporation, Tokyo (JP)

(72) Inventors: Jumpei Kamiya, Tokyo (JP); Masaya Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 218 days.

(21) Appl. No.: 17/907,902

(22) PCT Filed: Apr. 28, 2020

(86) PCT No.: PCT/JP2020/018073
§ 371 (c)(1),
(2) Date: Aug. 29, 2022

(87) PCT Pub. No.: WO2021/220387
PCT Pub. Date: Nov. 4, 2021

(65) Prior Publication Data
US 2023/0116247 A1    Apr. 13, 2023

(51) Int. Cl.
*B60W 40/103* (2012.01)
*B60W 40/09* (2012.01)
*G06V 20/56* (2022.01)

(52) U.S. Cl.
CPC .......... *B60W 40/103* (2013.01); *B60W 40/09* (2013.01); *B60W 2554/4041* (2020.02)

(58) Field of Classification Search
CPC ............... B60W 40/103; B60W 40/09; B60W 2554/4041; G06V 20/56

(Continued)

(56) References Cited

U.S. PATENT DOCUMENTS

2007/0173997 A1*  7/2007  Shiozawa ............... B60T 8/172
                                                             701/41
2008/0088424 A1   4/2008  Imura et al.
(Continued)

FOREIGN PATENT DOCUMENTS

JP   2088-094213 A   4/2008
JP   2019-131149 A   8/2019

OTHER PUBLICATIONS

Notification of Reasons for Refusal dated Mar. 14, 2023 from the Japanese Patent Office in application No. 2022-518475.
(Continued)

*Primary Examiner* — Tyler D Paige
(74) *Attorney, Agent, or Firm* — Sughrue Mion, PLLC

(57) ABSTRACT

This vehicle relative-position calculation device includes: a vehicle state information acquisition unit for acquiring state information of an own vehicle during traveling; a surrounding object information acquisition unit for acquiring information of a surrounding object around the own vehicle; a relative-position information conversion input unit to which relative-position information determined from the state information of the own vehicle and the information of the surrounding object, is inputted, and which converts the inputted relative-position information to relative-position information for which a specific position on the own vehicle is set as an origin; a position information storage unit which stores the relative-position information converted and a vehicle-fixed coordinate conversion unit to which the state information of the own vehicle acquired, is inputted, and which converts the relative-position information stored in the position information storage unit to present-time relative-position information, and outputs the present-time relative-position information to the position information storage unit.

4 Claims, 8 Drawing Sheets

(58) Field of Classification Search
USPC .......................................................... 701/400
See application file for complete search history.

(56) References Cited

U.S. PATENT DOCUMENTS

| 2019/0241183 A1* | 8/2019 | Han .................... B60W 30/025 |
| 2020/0216085 A1* | 7/2020 | Bobier-Tiu ........... B60W 40/08 |
| 2021/0061275 A1 | 3/2021 | Takahama |

OTHER PUBLICATIONS

Abe Masato, "Automotive Vehicle Dynamics ($2^{nd}$ edition)", Tokyo Denki University Press, Jan. 2012, pp. 64-64.
C. Ming Wang, "Location Estimation and Uncertainty Analysis for Mobile Robots" Tokyo Denki University Press, Jan. 2012, pp. 64-66.
International Search Report for PCT/JP2020/018073 dated Aug. 4, 2020 [PCT/ISA/210].

* cited by examiner

VEHICLE CONTROL DEVICE INCLUDING VEHICLE RELATIVE POSITION CALCULATION DEVICE

CROSS REFERENCE TO RELATED APPLICATIONS

This application is a National Stage of International Application No. PCT/JP2020/018073 filed Apr. 28, 2020.

TECHNICAL FIELD

The present disclosure relates to a vehicle relative-position calculation device and a vehicle control device.

BACKGROUND ART

Conventionally, it is known that the relative position between an own vehicle and a surrounding object detected by the own vehicle is stored and the stored relative position of the surrounding object is represented as surrounding object position coordinates in a vehicle-fixed coordinate system at the present time (for example, Patent Document 1 below). Here, the rotation amount in the yaw direction and the movement amounts in the front-rear direction and the lateral direction of the own vehicle are calculated, and the surrounding object position coordinates are rotationally converted on the basis of the rotation amount in the yaw direction of the own vehicle. From the rotationally converted surrounding object position coordinates and the movement amounts of the own vehicle, the surrounding object position coordinates in the vehicle-fixed coordinate system are estimated. Here, for calculation of the movement amount in the lateral direction of the own vehicle, a sideslip angle of the own vehicle is taken into consideration, and the sideslip angle is calculated using a vehicle speed, a steering angle, and a yaw rate.

CITATION LIST

Patent Document

Patent Document 1: Japanese Laid-Open Patent Publication No. 2008-94213

Non-Patent Document

Non-Patent Document 1: Abe, Masato, "Automotive vehicle dynamics theory and applications (2nd ed.)", Tokyo Denki University Press, pp. 64-65, January, 2012
Non-Patent Document 2: C. M. Wang, "Location estimation and uncertainty analysis for mobile robots," IEEE, pp. 1230-1235, 1988

SUMMARY OF THE INVENTION

Problems to be Solved by the Invention

However, in the method disclosed in Patent Document 1, when the surrounding object position coordinates are rotationally converted on the basis of the rotation amount in the yaw direction of the own vehicle, sideslip is not taken into consideration, and therefore there is a problem that the surrounding object position coordinates in the vehicle-fixed coordinate system cannot be estimated accurately. In a case of estimating a sideslip angle from a vehicle model using a vehicle speed and a steering angle as inputs, since the sideslip angle is calculated from the vehicle model using two inputs of the steering angle and the vehicle speed, the calculation is complicated, thus causing a problem that offset error occurs due to integral processing through a process for calculating the sideslip angle and estimation error occurs due to modeling error of the vehicle model.

The present disclosure has been made to solve the above problem, and an object of the present disclosure is to provide a vehicle relative-position calculation device capable of accurately estimating surrounding object position coordinates in a vehicle-fixed coordinate system through simple calculation without being influenced by offset error and vehicle modeling error.

Solution to the Problems

A vehicle relative-position calculation device comprising:
a vehicle state information acquisition circuitry to acquire state information of an own vehicle during traveling;
a surrounding object information acquisition circuitry to acquire information of a surrounding object around the own vehicle;
a relative-position information conversion input circuitry which is connected to the vehicle state information acquisition circuitry and the surrounding object information acquisition circuitry, and to which relative-position information is inputted, the relative-position information being relative information of the surrounding object around the own vehicle relative to the own vehicle determined from the state information of the own vehicle acquired by the vehicle state information acquisition circuitry and the information of the surrounding object acquired by the surrounding object information acquisition circuitry, the relative-position information conversion input circuitry being configured to convert the inputted relative-position information to relative-position information for which a specific position on the own vehicle is set as an origin;
a position information storage unit device which is connected to the relative-position information conversion input circuitry and stores the relative-position information converted by the relative-position information conversion input circuitry; and
a vehicle-fixed coordinate conversion circuitry which is connected to the vehicle state information acquisition circuitry and the position information storage unit device and to which the state information of the own vehicle acquired by the vehicle state information acquisition circuitry is inputted, the vehicle-fixed coordinate conversion circuitry being configured to convert the relative-position information stored in the position information storage device to present-time relative-position information which is relative-position information at a present time, and output the present-time relative-position information to the position information storage device.

Effect of the Invention

The vehicle relative-position calculation device according to the present disclosure makes it possible to accurately estimate surrounding object position coordinates in a vehicle-fixed coordinate system at the present time through simple calculation without being influenced by offset error and vehicle modeling error.

DESCRIPTION OF EMBODIMENTS

Figure 1:
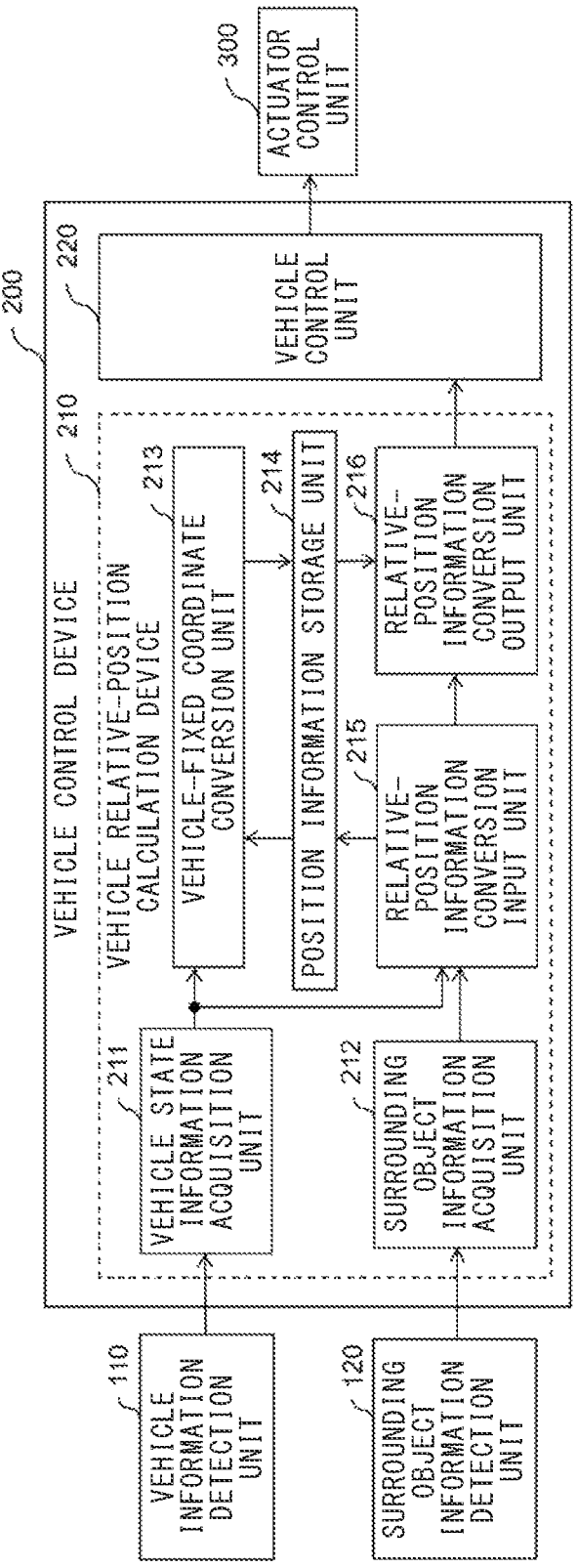
FIG. 1 is a block diagram showing the configuration of a vehicle control device according to embodiment 1.

Hereinafter, a preferred embodiment of a vehicle relative-position calculation device and a vehicle control device according to the present disclosure will be described with reference to the drawings. The present embodiment generally relates to technology for estimating the relative position between an own vehicle and a surrounding object. In the drawings, the same or corresponding parts are denoted by the same reference characters, to give description.

Embodiment 1

In the present embodiment, description will be given about a vehicle control device which represents a preceding vehicle traveling in front of an own vehicle and detected by the own vehicle, as a track in a vehicle-fixed coordinate system at the present time, and controls the vehicle so as to follow the detected preceding vehicle.

FIG. 1 is a block diagram showing the schematic configuration of the vehicle control device according to embodiment 1. A vehicle relative-position calculation device 210 according to the present embodiment is provided to a vehicle control device 200, and includes a vehicle state information acquisition unit 211, a surrounding object information acquisition unit 212, a vehicle-fixed coordinate conversion unit 213, a position information storage unit 214, a relative-position information conversion input unit 215, and a relative-position information conversion output unit 216.

The vehicle control device 200 is a device for controlling the vehicle, and is composed of a ROM and a RAM for storing various programs, and a CPU for executing the programs. The vehicle control device 200 is, for example, an advanced driver assistance system electronic control unit (ADAS-ECU).

In the vehicle relative-position calculation device 210 of the present embodiment, the relative-position information conversion input unit 215 performs relative position conversion for obtaining the relative position between the own vehicle and a surrounding object on the basis of the vehicle state of the own vehicle acquired by the vehicle state information acquisition unit 211 and surrounding object position information acquired by the surrounding object information acquisition unit 212, and performs coordinate conversion for the surrounding object position information acquired by the surrounding object information acquisition unit 212, with the origin set as a point where the sideslip angle of the vehicle is zero. The relative-position information conversion input unit 215 outputs the obtained result to the position information storage unit 214. The vehicle-fixed coordinate conversion unit 213 performs coordinate conversion for surrounding object position information stored in the position information storage unit 214, into a vehicle-fixed coordinate system, on the basis of the own-vehicle state acquired from the vehicle state information acquisition unit 211. The position information storage unit 214 performs also update of track information of the stored surrounding object positions. The relative-position information conversion output unit 216 performs conversion for the surrounding object position information stored in the position information storage unit 214, on the basis of a relative position conversion value calculated by the relative-position information conversion input unit 215 and a predetermined value determined depending on a location set as an origin for the surrounding object position information.

In addition, a vehicle control unit 220 is provided to the vehicle control device 200. The vehicle control unit 220 calculates a target value to be outputted to an actuator control unit 300, on the basis of the own-vehicle state and the surrounding object position information around the own vehicle calculated by the vehicle relative-position calculation device, and outputs the target value to the actuator control unit 300.

In addition, for the vehicle control device 200, a vehicle state information detection unit 110 and a surrounding object information detection unit 120 are provided as external input devices. Here, the vehicle state information detection unit 110 is a detection unit for detecting information about the own vehicle, and includes, for example, a vehicle speed sensor and a yaw rate sensor. The information detected by the vehicle state information detection unit 110 is acquired by the vehicle state information acquisition unit 211 provided to the vehicle relative-position calculation device 210.

The surrounding object information detection unit 120 is a detection unit for detecting information including the position of the surrounding object, and is, for example, a front camera. Alternatively, a light detection and ranging (LiDAR) device, a laser, a sonar, a vehicle-to-vehicle communication device, or a road-to-vehicle communication device is applicable. The information detected by the surrounding object information detection unit 120 is acquired by the surrounding object information acquisition unit 212 provided to the vehicle relative-position calculation device 210.

In addition, for the vehicle control device 200, the actuator control unit 300 is provided as an external device. The actuator control unit 300 is a control unit for performing control so that an actuator achieves the target value, and is, for example, an electric power steering ECU. Alternatively, a powertrain ECU or a brake ECU is applicable.

Figure 2:
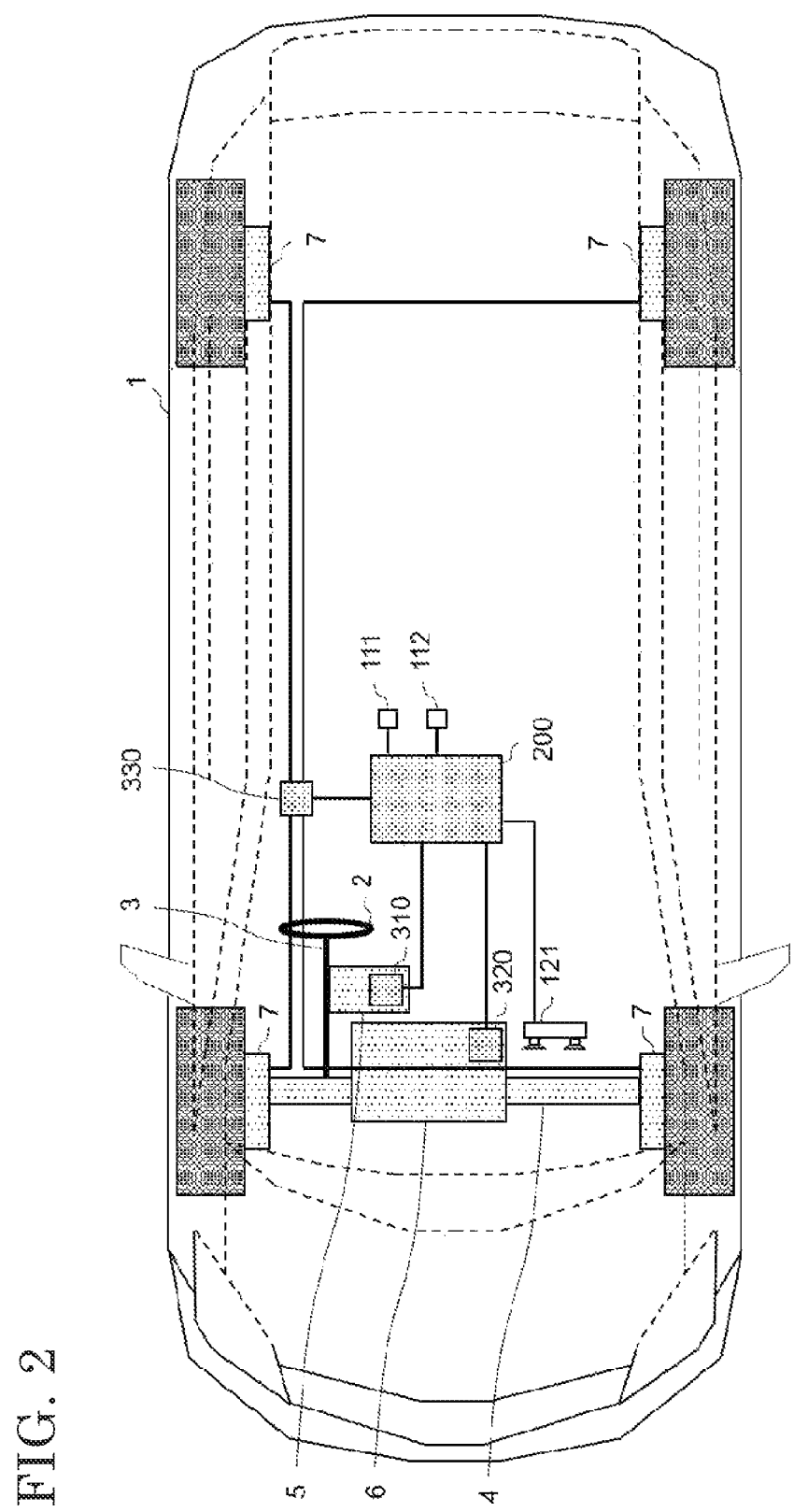
FIG. 2 is a schematic system configuration diagram of a vehicle provided with the vehicle control device according to embodiment 1.

FIG. 2 is a system configuration diagram showing the schematic configuration of the vehicle provided with the vehicle control device according to embodiment 1. In FIG. 2, the vehicle 1 includes a steering wheel 2, a steering shaft 3, a steering unit 4, an electric power steering unit 5, a powertrain unit 6, a brake unit 7, a yaw rate sensor 111, a vehicle speed sensor 112, a front camera 121, the vehicle control device 200, an electric power steering controller 310, a powertrain controller 320, and a brake controller 330.

The steering wheel 2 provided for a driver to operate the vehicle 1 is joined to the steering shaft 3. The steering unit 4 is connected to the steering shaft 3. The steering unit 4 rotatably supports front wheels which are steered wheels, and is turnably supported by a vehicle body frame.

Therefore, torque generated through operation of the steering wheel 2 by the driver rotates the steering shaft 3, to turn the front wheels in the left-right direction by the steering unit 4. Thus, the driver can operate the lateral movement amount of the vehicle when the vehicle moves frontward/backward. The steering shaft 3 can also be rotated by the electric power steering unit 5, and through a command to the electric power steering controller 310, the front wheels can be freely turned independently of operation of the steering wheel 2 by the driver.

The vehicle control device 200 is configured by an integrated circuit such as a microprocessor, and includes an A/D conversion circuit, a D/A conversion circuit, a CPU, a ROM, a RAM, and the like. The yaw rate sensor 111 for detecting the yaw rate of the vehicle 1, the vehicle speed sensor 112 for detecting the speed of the vehicle 1, the front camera 121, the electric power steering controller 310, the powertrain controller 320, and the brake controller 330 are connected to the vehicle control device 200.

The vehicle control device 200 processes information inputted from the connected sensors in accordance with a program stored in the ROM, transmits a target steering angle to the electric power steering controller 310, transmits a target drive force to the powertrain controller 320, and transmits a target braking force to the brake controller 330. In a case where acceleration/deceleration control is not performed by the vehicle control device 200, the powertrain controller 320 and the brake controller 330 need not be connected to the vehicle control device 200.

The front camera 121 is provided at a position where the front camera 121 can detect marking lines in front of the vehicle as an image, and detects information of a surrounding object frontward of the own vehicle, such as lane information or the position of an obstacle, on the basis of the image information. Although only the camera for detecting a frontward surrounding object is shown as an example in the present embodiment, a camera for detecting a rearward or lateral surrounding object may be provided.

The electric power steering controller 310 controls the electric power steering unit 5 so as to achieve the target steering angle transmitted from the vehicle control device 200. The powertrain controller 320 controls the powertrain unit 6 so as to achieve the target drive force transmitted from the vehicle control device 200. In a case where the driver performs speed control, the powertrain unit 6 is controlled on the basis of the amount of tread on an accelerator pedal.

Although the vehicle using only an engine as a drive force source is shown as an example in the present embodiment, a vehicle using only an electric motor as a drive force source, a vehicle using both an engine and an electric motor as a drive force source, or the like is also applicable.

The brake controller 330 controls the brake unit 7 so as to achieve the target braking force transmitted from the vehicle control device 200. In a case where the driver performs speed control, the brake unit 7 is controlled on the basis of the amount of tread on a brake pedal.

Hereinafter, actual operation of the above vehicle control device 200 will be described in more detail with reference to the drawings.

Figure 3:
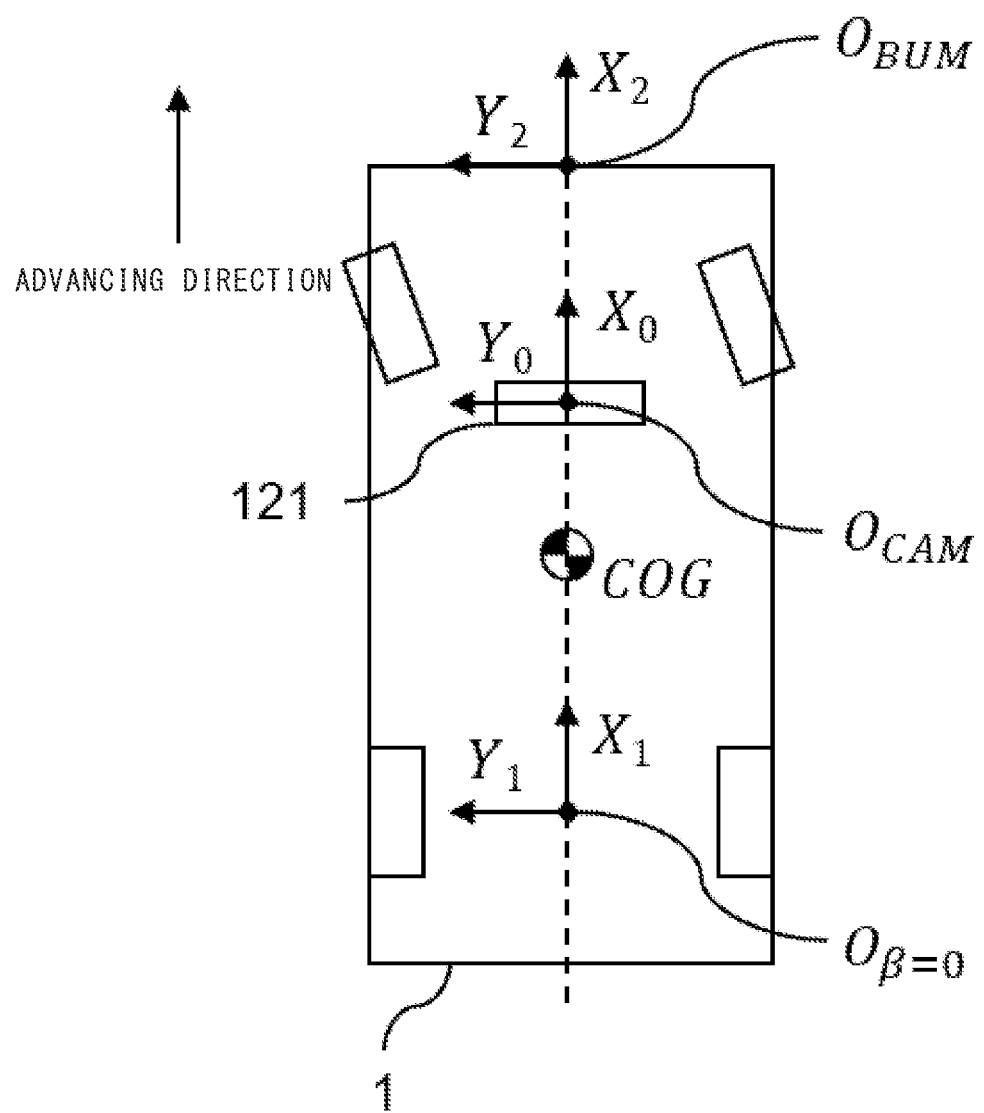
FIG. 3 illustrates coordinate systems for explaining operation of the vehicle control device according to embodiment 1.

FIG. 3 is a diagram showing coordinate systems used for explanation therefor. Here, as sub-coordinate systems for the vehicle-fixed coordinate system, the following three kinds of coordinate systems are defined, and description will be given using these coordinate systems. In the drawings, a coordinate system represented by $X_0$, $Y_0$ is a camera coordinate system with an origin $O_{CAM}$ set at a detection reference position of the front camera 121 attached on the center axis of the vehicle 1 indicated by a dotted line. A coordinate system represented by $X_1$, $Y_1$ is a yaw rotation center coordinate system with an origin $O_{\beta=0}$ set at a position where the sideslip angle is zero on the center axis of the vehicle 1. A coordinate system represented by $X_2$, $Y_2$ is a bumper coordinate system with an origin $O_{BUM}$ set at a bumper position on the center axis of the vehicle 1.

In the description below, the following notations are used regarding these plurality of coordinate systems. For example, a position vector is denoted by PCAM_p in the camera coordinate system, by PYAW_p in the yaw rotation center coordinate system, and by PBUM_p in the bumper coordinate system. That is, three characters as abbreviation of the corresponding coordinate system are written before a symbol p of a position vector. It is noted that a character written in an italic format (here, p) indicates that this is a vector.

Figure 4:
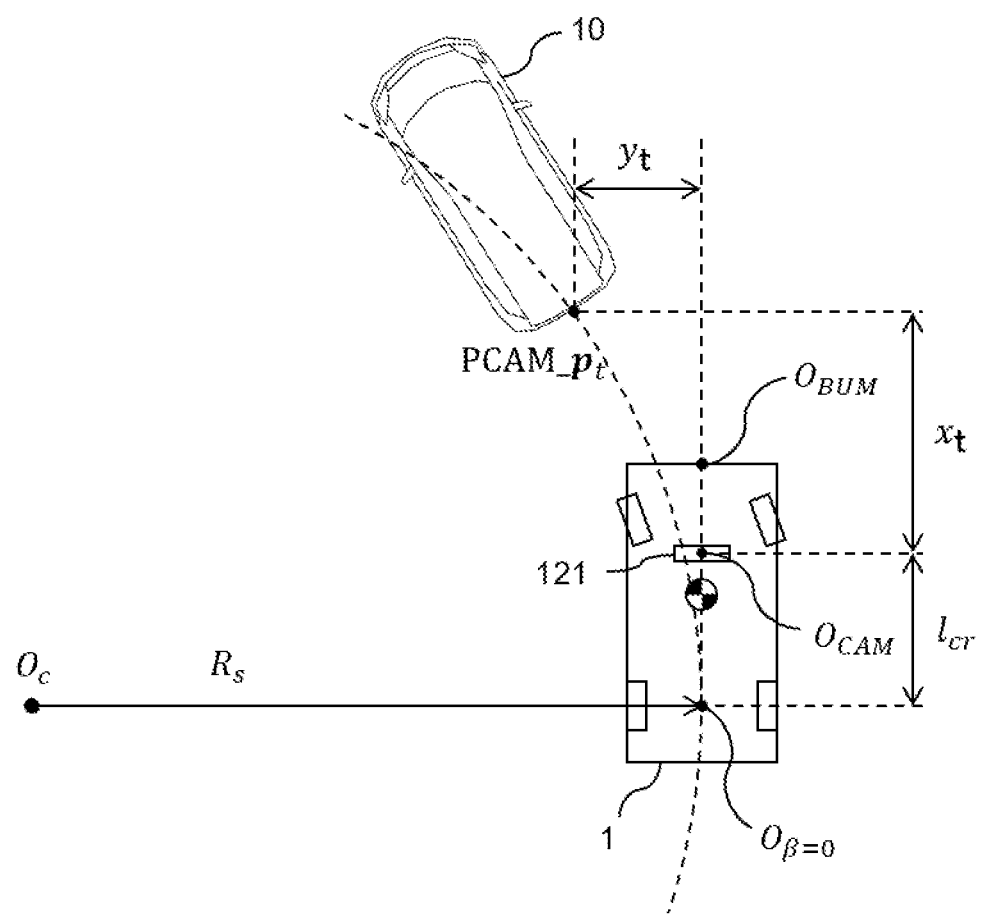
FIG. 4 illustrates steady-state circular turning at an extremely low speed of the vehicle provided with the vehicle control device according to embodiment 1.

FIG. 4 shows a scene of steady-state circular turning at an extremely low speed of the vehicle 1 in embodiment 1. In FIG. 4, a preceding vehicle 10 is traveling in front of the vehicle 1, and the front camera 121 detects the relative position between the preceding vehicle 10 and the vehicle 1. The detected relative position is PCAM_$p_t$=$[x_t, y_t, 1]^T$ (here, "t" denotes the time when the detection is performed and "T" is a symbol indicating a transposed matrix; hereinafter, the same applies). When the vehicle 1 is at an extremely low speed, no centrifugal force acts on the vehicle. Therefore, steady-state circular turning is performed in a geometrical relationship of Ackermann steering geometry (in this case, the rotation centers of the four wheels on the front and rear sides are at one identical point Oc), and there is no sideslip angle at the rear shaft center. Accordingly, here, the rear shaft center is set as the origin $O_{\beta=0}$ of the yaw rotation center coordinate system.

In FIG. 4, $l_{cr}$ denotes a distance from the detection reference position of the front camera 121 to the rear shaft center, and $x_t$ and $y_t$ respectively denote distances in an X direction (the advancing direction of the own vehicle at the point $O_{CAM}$) and a Y direction (the direction orthogonal to the X direction) from the detection reference position of the front camera 121 to the position (see above PCAM_$p_t$) where the preceding vehicle 10 is detected.

Figure 5:
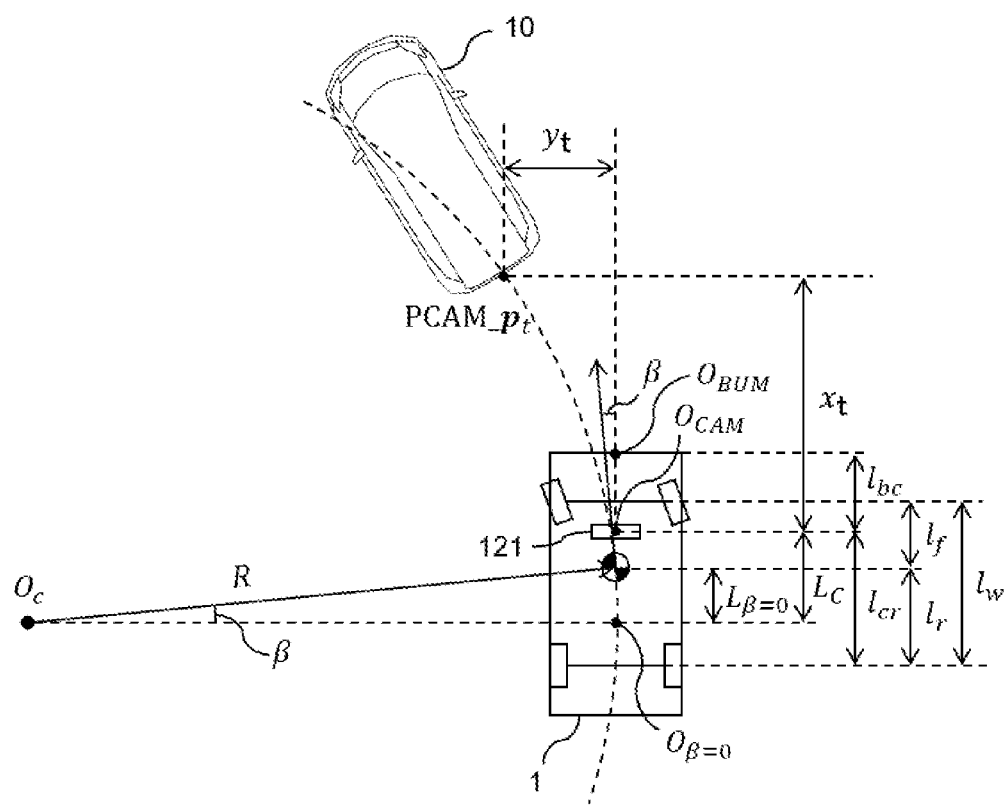
FIG. 5 illustrates a case where a centrifugal force is not negligible in steady-state circular turning of the vehicle provided with the vehicle control device according to embodiment 1.

Next, FIG. 5 shows a case of such a vehicle speed that the centrifugal force of steady-state circular turning is not negligible, unlike the extremely low vehicle speed. As the vehicle speed increases, the position $O_{\beta=0}$ where the sideslip angle is zero on the vehicle center axis moves frontward from the rear shaft center.

Here, a turning radius R of steady-state circular turning of the center of gravity and a sideslip angle β can be calculated by Expression (1) and Expression (2) from a vehicle weight m, a front shaft-gravity center distance $l_f$, a rear shaft-gravity center distance $l_r$, a wheelbase $l_w$, front wheel cornering power $K_f$, rear wheel cornering power $K_r$, a vehicle speed v, and a steering angle δ (see, for example, Expression 3.29 and Expression 3.31 in Non-Patent Document 1).

[Mathematical 1]

$$R = \left(1 - \frac{m(l_f K_f - l_r K_r)}{2l_w^2 K_f K_r} v^2\right) \frac{l_w}{\delta} \quad (1)$$

[Mathematical 2]

$$\beta = \left(\frac{l_r - \frac{m l_f}{2l_w K_r} v^2}{1 - \frac{m(l_f K_f - l_r K_r)}{2l_w^2 K_f K_r} v^2}\right) \frac{\delta}{l_w} \quad (2)$$

From Expression (1) and Expression (2), $L_{\beta=0}$ which is the distance from the center of gravity to the position where the sideslip angle is zero on the vehicle body center axis, is represented by Expression (3).

[Mathematical 3]

$$L_{\beta=0} = R\sin\beta \approx R\beta = \left(l_r - \frac{m l_f}{2l_w K_r} v^2\right) \quad (3)$$

Using Expression (3), where the distance from the detection reference position of the front camera 121 to the rear shaft center is denoted by $l_{cr}$, a distance $L_c$ from the origin $O_{CAM}$ of the camera coordinate system to the origin $O_{\beta=0}$ of the yaw rotation center coordinate system is represented by Expression (4).

[Mathematical 4]

$$L_c = \left(l_{cr} - \frac{m l_f}{2l_w K_r} v^2\right) \quad (4)$$

Hereinafter, the distance $L_c$ may be referred to as a relative position conversion value.

In a case where the vehicle 1 is performing steady-state circular turning, the position of the preceding vehicle at time t is denoted by PCAM_p$_t$, and at time t, a position PCAM_p$_{t-1}$ of the preceding vehicle at time t-1 is considered. Here, PCAM_p is in the camera coordinate system. On the other hand, the yaw rate detected on the vehicle 1 is in the yaw rotation center coordinate system.

Therefore, considering a yaw angular momentum and a movement amount of the vehicle 1 during a control cycle from time t-1 to time t, the position PCAM_p$_{t-1}$ of the preceding vehicle in the camera coordinate system at time t-1 can be converted into the yaw rotation center coordinate system at the present time t, by performing coordinate conversion for the PCAM_p$_{t-1}$ into the yaw rotation center coordinate system at the present time t-1 and then performing calculation for reflecting the yaw angular momentum and the movement amount during the control cycle of the vehicle 1. Then, the calculated value can be converted into the camera coordinate system at time t, by further performing coordinate conversion from the yaw rotation center coordinate system to the camera coordinate system.

For the coordinate conversion, the relative position conversion value $L_c$ that can be calculated by Expression (4) is used. The preceding vehicle position PYAW_p in the yaw rotation center coordinate system is in a coordinate system where the sideslip angle is zero.

In the calculation for the relative position conversion value $L_c$, the vehicle speed v is used as one input, and the vehicle weight m, the front shaft-gravity center distance $l_f$, the wheelbase $l_w$, and the rear wheel cornering power $K_r$ are parameters that can be defined in advance for each vehicle. Therefore, the calculation is easy. In addition, since the number of parameters defined in advance is small, modeling error is less likely to occur. In addition, since integral is not included in the calculation, offset error does not occur.

With respect to the position PCAM_p$_t$ of the preceding vehicle sequentially detected by the front camera, the movement amount of the own vehicle is sequentially calculated through the above method, whereby it is possible to accurately express the position of the preceding vehicle in the vehicle-fixed coordinate system as a track.

Figure 6:
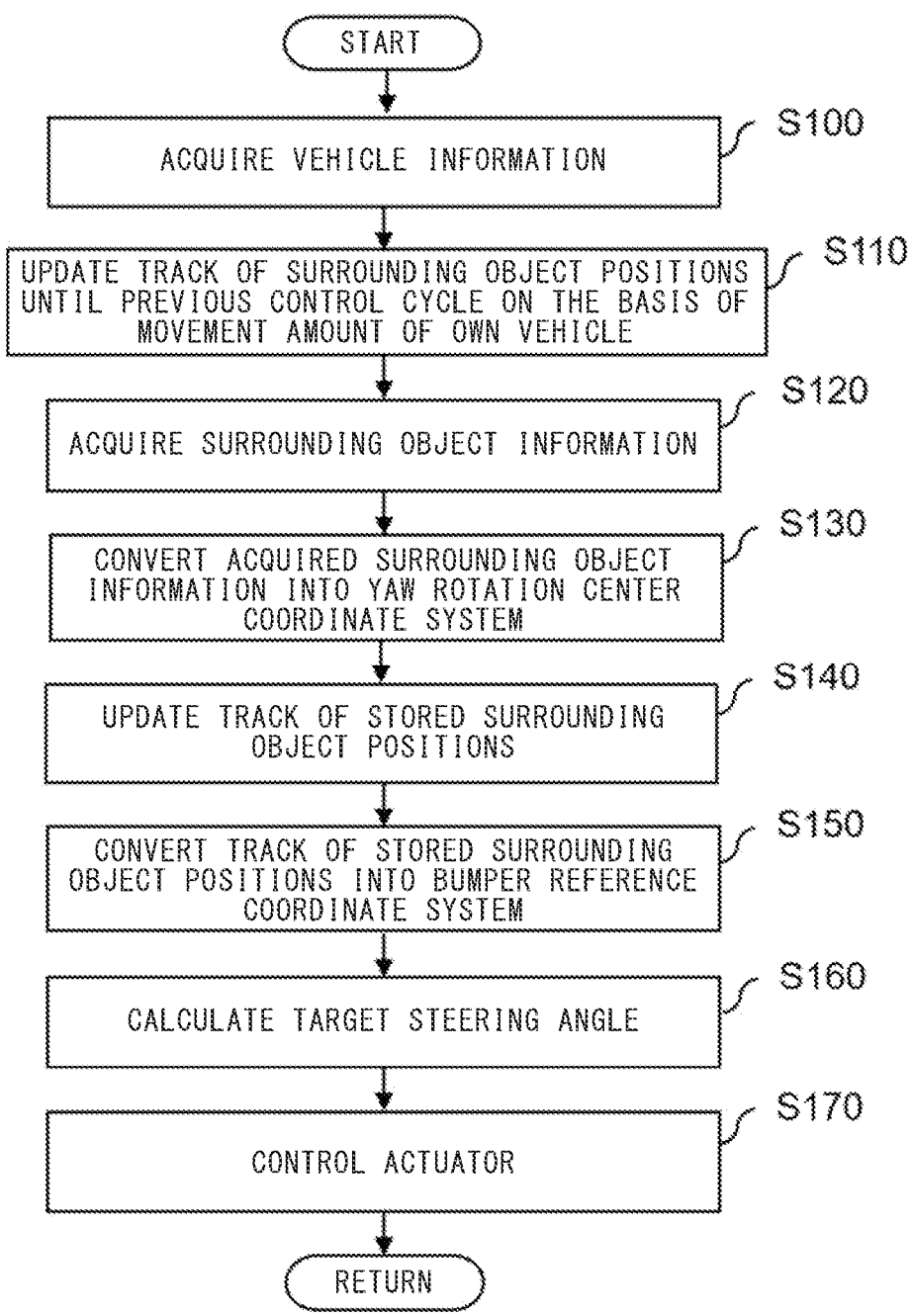
FIG. 6 is a flowchart showing an operation procedure for the vehicle control device according to embodiment 1.

FIG. 6 is a flowchart showing an operation procedure in the vehicle control device of embodiment 1. With reference to the flowchart, operation for one control cycle described below in the vehicle control device will be described. In the actual device, the series of operations is repeated for necessary control cycles. For clarifying this, the lowermost stage in the flowchart is indicated as not "END" but "RETURN" which is normally used in indication of a sub-flowchart.

First, in step S100 in the entire process shown in FIG. 6, the vehicle state information acquisition unit acquires vehicle state information. The vehicle state information is information such as the yaw rate and the speed of the own vehicle. In the present embodiment, the yaw rate γ and the vehicle speed v are acquired.

In the next step S110, the vehicle-fixed coordinate conversion unit calculates a surrounding object position PYAW_cp$_k$ in the yaw rotation center coordinate system at the present time, on the basis of the movement amount and the yaw-direction rotation amount of the own vehicle from the previous control cycle and the track of surrounding object positions PYAW_p$_k$ (k=1, ..., N) in the yaw rotation center coordinate system stored in the position information storage unit.

In the present embodiment, a movement amount $[sx, sy]^T$ of the own vehicle is approximated by an arc, and is calculated by Expression (5) using the vehicle speed v and the yaw rate γ acquired in step S100 and a control cycle dt (see, for example, Non-Patent Document 2). The control cycle dt is the calculation cycle of the entire flowchart in FIG. 6, and is, for example, 100 ms.

[Mathematical 5]

$$\begin{bmatrix} sx \\ sy \end{bmatrix} = \begin{bmatrix} \cos\left(\frac{\gamma dt}{2}\right) \\ \sin\left(\frac{\gamma dt}{2}\right) \end{bmatrix} \left[v dt \operatorname{sinc}\left(\frac{\gamma dt}{2}\right)\right] \quad (5)$$

If γdt is sufficiently small, Expression (6) may be used instead.

[Mathematical 6]

$$\begin{bmatrix} sx \\ sy \end{bmatrix} \approx \begin{bmatrix} \cos\left(\frac{\gamma dt}{2}\right) \\ \sin\left(\frac{\gamma dt}{2}\right) \end{bmatrix} [v dt] \quad (6)$$

A matrix for conversion to the present time in the yaw rotation center coordinate system is set as shown in Expression (7) on the basis of the movement amount $[sx, sy]^T$ of the own vehicle, the yaw rate γ acquired in step S100, and the control cycle dt.

[Mathematical 7]

$$PYAW\_T_{DR} = \begin{bmatrix} \cos(-\gamma dt) & -\sin(-\gamma dt) & -sx \\ \sin(-\gamma dt) & \cos(-\gamma dt) & sy \\ 0 & 0 & 1 \end{bmatrix} \quad (7)$$

Next, the surrounding object position $PYAW\_cp_k$ (k=1, N) at the present time in the yaw rotation center coordinate system is calculated by Expression (8).

[Mathematical 8]

$$PYAW\_cp_k(k=1,\ldots,N)=PYAW\_T_{DR}PYAW\_p_k \quad (k=1,\ldots,N) \quad (8)$$

In the next step S120, the surrounding object information acquisition unit acquires the surrounding object information. The surrounding object information is information including the position of the surrounding object. In the present embodiment, the position $PCAM\_p_t=[x_t, y_t, 1]^T$ of the preceding vehicle to be followed by the own vehicle at the present time t is acquired.

In the next step S130, the relative-position information conversion input unit calculates the relative position conversion value, and converts the surrounding object information acquired in step S120, into the yaw rotation center reference coordinate system. In the present embodiment, the relative position conversion value $L_c$ is calculated using Expression (4) from the vehicle weight m, the front shaft-gravity center distance $l_f$, the wheelbase $l_w$, and the rear wheel cornering power $K_r$ set in advance for the vehicle and the vehicle speed v acquired in step S100.

A matrix for conversion to the yaw rotation center reference coordinate system is set as shown in the following Expression (9) on the basis of the relative position conversion value $L_c$.

[Mathematical 9]

$$PYAW\_T_{CAM} = \begin{bmatrix} 1 & 0 & L_c \\ 0 & 1 & 0 \\ 0 & 0 & 1 \end{bmatrix} \quad (9)$$

A surrounding object position $PYAW\_p_t$ in the yaw rotation center coordinate system is calculated by the following Expression (10) using the conversion matrix $PYAW\_T_{CAM}$ set in the above Expression (9).

[Mathematical 10]

$$PYAW\_p_t=PYAW\_T_{CAM}PCAM\_p_t \quad (10)$$

In the next step S140, the position information storage unit performs update of track information of the surrounding object positions stored therein. The surrounding object position $PYAW\_p_t$ calculated in step S130 is added as a latest value, and among the surrounding object positions $PYAW\_cp_k$ (k=1, ..., N) at the present time updated in step S110, the surrounding object position $PYAW\_cp_N$ for the oldest time is deleted, as shown in Expression (11).

[Mathematical 11]

$$\left.\begin{array}{l} PYAW\_p_1 = PYAW\_p_t \\ PYAW\_p_2 = PYAW\_cp_1 \\ \vdots \quad \vdots \\ PYAW\_p_{N-1} = PYAW\_cp_{N-2} \\ PYAW\_p_N = PYAW\_cp_{N-1} \end{array}\right\} \quad (11)$$

In the next step S150, the relative-position information conversion input unit converts the track information of the surrounding object positions stored in the position information storage unit, into the bumper coordinate system. In the present embodiment, a matrix for conversion to the bumper coordinate system is set as shown in Expression (12) on the basis of the relative position conversion value $L_c$ calculated in step S130 and the distance $l_{bc}$ between the origin of the bumper coordinate system and the origin of the camera coordinate system.

[Mathematical 12]

$$PBUM\_T_{YAW} = \begin{bmatrix} 1 & 0 & -(L_C + l_{bc}) \\ 0 & 1 & 0 \\ 0 & 0 & 1 \end{bmatrix} \quad (12)$$

A track $PBUM\_p_k$ (k=1, ..., N) of the surrounding object position in the bumper coordinate system is calculated by Expression (13).

[Mathematical 13]

$$PBUM\_p_k=PBUM\_T_{YAW}PYAW\_p_k(k=1,\ldots,N) \quad (13)$$

Here, by optionally changing the conversion matrix, it is possible to set any position as an origin for the track information of the surrounding object positions stored in the position information storage unit. For example, in a case of desiring conversion to the camera coordinate system, the conversion matrix may be set as shown in Expression (14) and calculation may be performed as shown in Expression (15).

[Mathematical 14]

$$PCAM\_T_{YAW} = \begin{bmatrix} 1 & 0 & -L_C \\ 0 & 1 & 0 \\ 0 & 0 & 1 \end{bmatrix} \quad (14)$$

[Mathematical 15]

$$PCAM\_p_k = PCAM\_T_{YAW}PYAW\_p_k(k=1,\ldots,N) \quad (15)$$

In the next step S160, a target steering angle for following the preceding vehicle is calculated on the basis of the track of the surrounding object positions calculated in step S150.

In the last step S170, the actuator control unit controls the actuator so as to achieve the target value. In the present embodiment, steering control is assumed and control is performed using known technology such as PID control in the electric power steering unit so as to achieve the target steering angle.

Figure 7:
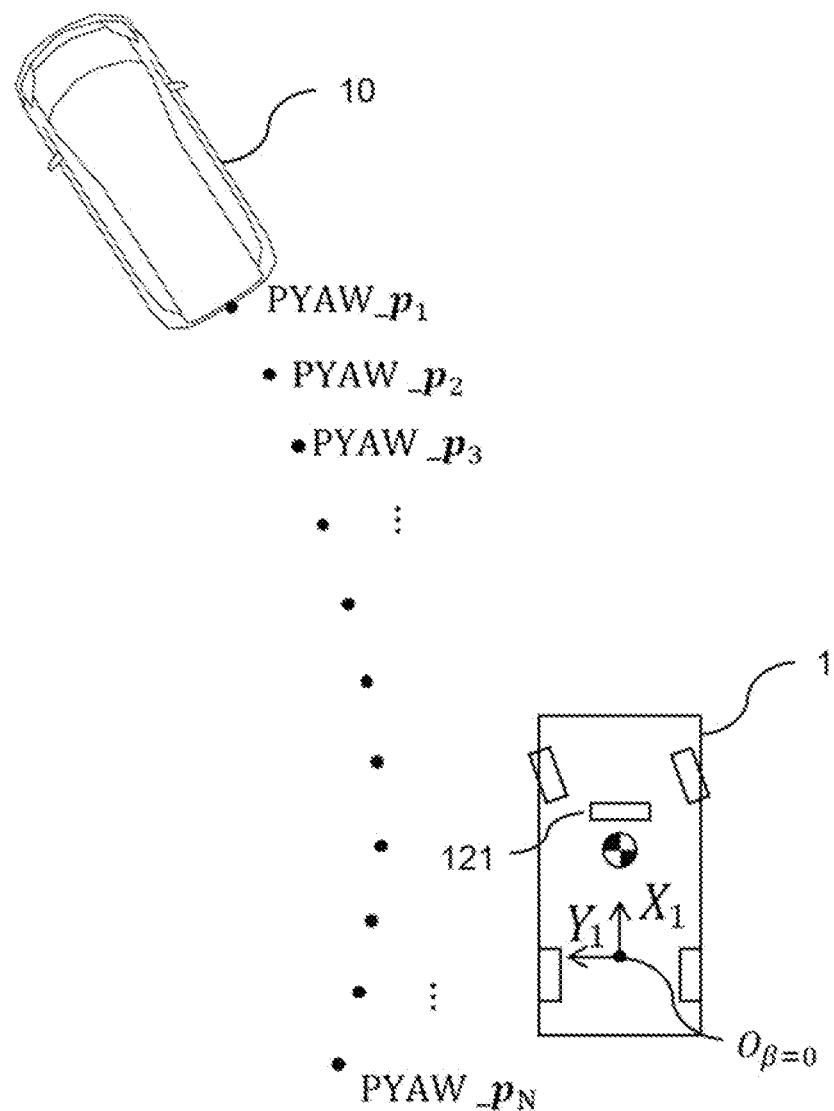
FIG. 7 illustrates an example of a movement track of a surrounding object stored in a vehicle relative-position calculation device of the vehicle control device according to embodiment 1.

FIG. 7 shows a track of surrounding object positions stored in the position information storage unit when the vehicle is controlled so as to follow the preceding vehicle under application of the vehicle relative-position calculation device in the present embodiment described with reference to FIG. 6. A set of points indicated by $PYAW\_p_k$ (k=1, ..., N) represents a track through which the preceding vehicle has traveled.

With the above configuration, it is possible to accurately estimate the past surrounding object positions through simple calculation without being influenced by offset error and modeling error. Thus, a track can be obtained with high accuracy, whereby control that enables the own vehicle to accurately follow the preceding vehicle can be achieved.

In addition, the relative-position information conversion input unit is provided for converting surrounding object position information stored in the position information storage unit to a relative-value position for which any point on the own vehicle is set as an origin. Thus, the surrounding object position can be changed to surrounding object position information for which any point on the vehicle is set as an origin. For example, in a case where a vehicle control device for performing control in a camera coordinate system is provided, by converting surrounding object position information into a camera coordinate system and then outputting the converted information, it becomes possible to use highly accurate surrounding object position information for which the control system of the vehicle control device need not be changed.

Further, with the configuration of the vehicle control device having the above vehicle relative-position calculation device and the vehicle control unit, past surrounding object positions can be obtained with high accuracy, whereby performance of control for the vehicle behavior is improved. Specifically, it becomes possible to improve follow-up performance in vehicle control for following the preceding vehicle or accurately perform obstacle avoidance in vehicle control for avoiding an obstacle.

Figure 8:
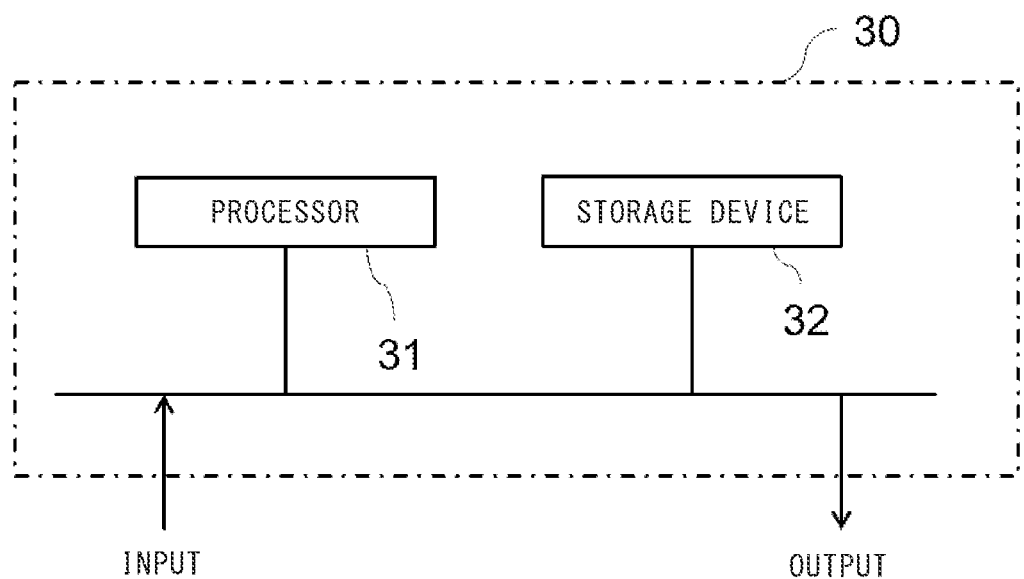
FIG. 8 shows an example of hardware for signal processing in the vehicle relative-position calculation device of the vehicle control device according to embodiment 1.

FIG. 8 shows an example of hardware 30 for the signal processing in the vehicle relative-position calculation device according to the present disclosure. As shown in FIG. 8, the hardware 30 for the signal processing in this device includes a processor 31 and a storage device 32. The storage device 32 is provided with a volatile storage device such as a random access memory and a nonvolatile auxiliary storage device such as a flash memory (which are not shown). Instead of a flash memory, an auxiliary storage device of a hard disk may be provided. The processor 31 executes a program inputted from the storage device 32. In this case, the program is inputted from the auxiliary storage device to the processor 31 via the volatile storage device. The processor 31 may output data such as a calculation result to the volatile storage device of the storage device 32, or may store such data into the auxiliary storage device via the volatile storage device.

The contents described in the above embodiment are merely examples and the present disclosure is not limited thereto. For example, the configuration in which the position of the surrounding object around the own vehicle is represented in the vehicle-fixed coordinate at the present time, to perform vehicle control, is also applicable to various cases other than the present embodiment. For example, this configuration is applicable to a vehicle control device for detecting an obstacle as a surrounding object and controlling a vehicle so as to avoid the obstacle or to stop, or a vehicle control device for detecting a white line on a road as a surrounding object and controlling a vehicle so as to travel along the white line. A person skilled in the art can implement the vehicle relative-position calculation device and the vehicle control device according to the present embodiment in other various manners without deviating from the gist of the present embodiment.

DESCRIPTION OF THE REFERENCE CHARACTERS 1 vehicle
2 steering wheel
3 steering shaft
4 steering unit
5 electric power steering unit
6 powertrain unit
7 brake unit
10 preceding vehicle
111 yaw rate sensor
112 vehicle speed sensor
121 front camera
200 vehicle control device
210 vehicle relative-position calculation device
211 vehicle state information acquisition unit
212 surrounding object information acquisition unit
213 vehicle-fixed coordinate conversion unit
214 position information storage unit
215 relative-position information conversion input unit
216 relative-position information conversion output unit
220 vehicle control unit
300 actuator control unit
310 electric power steering controller
320 powertrain unit
330 brake controller

The invention claimed is:

1. A vehicle control device comprising at least one processor configured to:
   state information of an own vehicle during traveling;
   acquire information of a surrounding object around the own vehicle;
   acquire relative-position information, which is positional data of the surrounding object relative to the own vehicle that is determined from the state information of the own vehicle and the information of the surrounding object, and convert the relative-position information using a specific position on the own vehicle as an origin;
   store the converted relative-position information at a preceding time t-1; and
   receive the state information of the own vehicle and based on a yaw angular momentum and a movement amount of the own vehicle during a control system from the preceding time t-1 to a present time t, convert the relative-position information from a camera coordinate system at the preceding time t-1 to a yaw rotation center coordinate system at the present time t, and then to the camera coordinate system at the present time t; and
   control movement of the own vehicle based on the relative-position information in the camera coordinate system at the present time t and the state information of the own vehicle.

2. The vehicle control device according to claim 1, wherein
   the specific position is a position where a sideslip angle of the own vehicle is zero.

3. The vehicle control device according to claim 1, wherein the at least one processor is further configured to convert the relative-position information at the present time t from the camera coordinate system to a bumper coordinate system for which a predetermined position on the own vehicle is set as an origin.

4. The vehicle control device according to claim 2, wherein the at least one processor is further configured to convert the relative-position information at the present time t from the camera coordinate system to a bumper coordinate system for which a predetermined position on the own vehicle is set as an origin.

* * * * *